Feb. 2, 1960     A. V. WEASLER     2,923,140
QUICKLY DEMOUNTABLE FREE WHEELING GUARD FOR A SHAFT
Filed Oct. 17, 1958
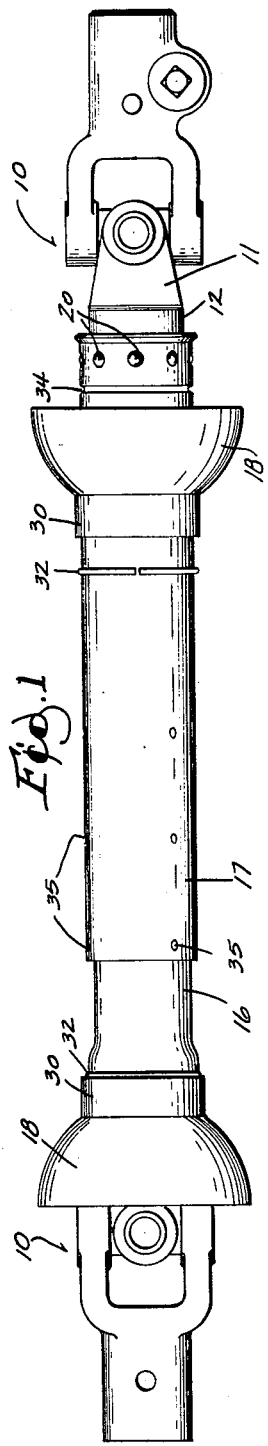
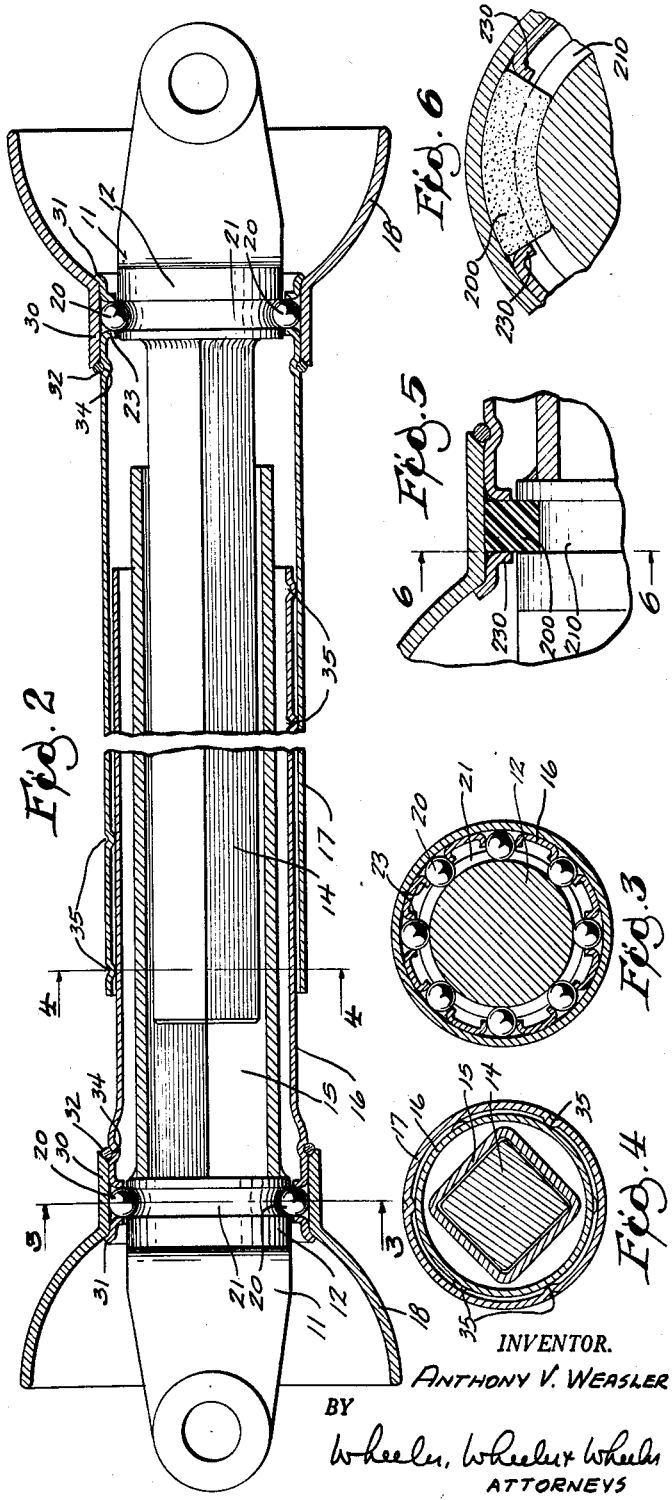
INVENTOR.
ANTHONY V. WEASLER
BY
Wheeler, Wheeler & Wheeler
ATTORNEYS

2,923,140

QUICKLY DEMOUNTABLE FREE WHEELING GUARD FOR A SHAFT

Anthony V. Weasler, West Bend, Wis.

Application October 17, 1958, Serial No. 767,801

5 Claims. (Cl. 64—4)

This invention relates to a quickly demountable free wheeling guard for a shaft.

The type of guard involved has a non-unitary bearing assembly supporting it from the shaft which is protected. The problem of quickly detaching such a guard is principally concerned with the ease with which the bearings are assembled. The present application is a companion to my copending application, Serial No. 720,629, filed March 11, 1958.

The shaft selected for the purposes of this disclosure of an embodiment of the invention is a telescopic shaft having universal joints at its ends. Desirably the inner races of the respective ball bearings for the guard are made by grooving the hubs of the universal joint members at the ends of the shaft sections. The guard comprises telescopically related tubes. These are punched to provide radial annular flanges which constitute the bearing retainers. At the end of each of the tubular guard sections is an extension bell having a mounting sleeve portion which extends across the balls to provide an outer race for each bearing.

In the drawings:

Fig. 1 is a view in side elevation of an inverted telescopic universally jointed shaft made in accordance with the invention, an outer bearing race being shown displaced axially to give access to the bearing means.

Fig. 2 is a view showing the shaft and its guard in section on an enlarged scale.

Fig. 3 is a view taken in section on line 3—3 of Fig. 2.

Fig. 4 is a view taken in section on line 4—4 of Fig. 2.

Fig. 5 is a fragmentary detail view on an enlarged scale showing a modified bearing in axial section.

Fig. 6 is a view taken in section on the line 6—6 of Fig. 5.

Telescopically associated shaft members 14 and 15 are desirably square in cross section. At their opposite ends they are provided with universal joints generically designated by reference character 10 and each comprising a yoke 11 provided with a hub portion 12 fixed by welding or otherwise to the end of the respective shaft section 14 or 15.

The guard illustrated comprises a pair of telescopically associated sleeves 16, 17, each of which is desirably provided with an extension bell 18 which at least partially encloses the associated universal joint 10 when the parts are assembled in a position for use as shown in Fig. 2.

It is desirable that the components of the guard be mounted from the corresponding components of the shaft without being constrained to rotate with the shaft so that, if a user accidentally falls against, or otherwise touches the guard, the rotation of the guard will readily be arrested. To this end, the guard is supported on bearing means such as the balls shown at 20 which roll on an inner race. In the preferred construction illustrated, the hub portion 12 of each of the universal joint yokes 11 is provided with a race channel at 21 which receives the bearing balls 20.

As a retainer for the bearing means, the respective guard sleeves 16, 17 are provided opposite channels 21 with inwardly formed flanges 23. These flanges are just sufficiently spaced to accommodate the bearing means and provide clearance. Various types of bearing means are herein disclosed. For the purposes of receiving the balls 20, the flanges are annular and somewhat frustoconical and disposed on axes which are radial respecting the shaft. Each flange, therefore, constitutes a ball-confining pocket and the flanges engage the ball approximately centrally on its equator, as clearly appears in Figs. 2 and 3. Since the flanges are desirably made by punching inwardly some of the material of the sleeve, the interior surface of each annular flange merges curvilinearly with the external surface of the sleeve from which it is punched, the cross section enclosed by respective flanges decreasing from the exterior surface of the sleeve toward the level at which the respective flanges engage the balls intermediate the inner and outer races between which the balls are confined.

Figs. 5 and 6 show that the bearing means need not necessarily constitute balls. Here the bearing means comprise arcuate segments or blocks 200 of any desired angular extent between the races. The material may comprise anything which has a low co-efficient of friction with respect to the races. Both nylon and Teflon have been found suitable. Aside from the fact that the flanges 230 are not circular, but oblong and of a length suitable to accommodate the bearing element 200, the construction is essentially similar. The inner race 210 differs from the race 21 only to accommodate the change in cross section of the bearing element 200 from circular to rectangular.

The outer race for each set of bearing means conveniently comprises a collar 30 fixed to the contiguous bell 18 and preferably made by expanding one end of a tube to bell form, the other end constituting the collar. This collar is telescoped over the appropriate guard sleeve 16 or 17 but is not necessarily fast thereto. In the preferred construction shown, the end of the guard sleeve is provided with a flared flange 31 against which the bell seats, the bell being held to its seat against such flange by a split ring 32 or other fastener. Assuming that the fastener has the form of a ring, it may conveniently be anchored in a groove 34 rolled or otherwise formed in the respective guard sleeve 16 or 17. The outer race collar 30 is shown in its operative position on the guard sleeve 16 in Fig. 1 while the collar 30 on guard sleeve 17 has been slid axially of the guard sleeve away from its operative position to expose bearing means 20 or 200 and their receiving openings within the annular flanges 23, or 230, thus showing how easily the device may be disassembled and assembled. If the bearing means comprise balls and the retainer is packed with grease prior to assembly, the grease will hold the balls in their respective openings in the retaining portion of the guard sleeve until the outer cage is positioned about the balls as described. To free the ring 32 from its groove 34, no tool other than a screwdriver or a knife is required.

In order to provide ample working clearance between the guard sleeves to permit the device to operate without binding while, at the same time, preventing rattling such as would occur if the parts were unduly free, it is preferred that one or both of the telescopically related guard sleeves be provided with bosses radially offset toward the other. By way of exemplification, both of the guard sleeves 16 and 17 have been embossed radially at 35 to engage the surface of the other sleeve at a number of points spaced circumferentially of the guard and also at a number of points spaced axially thereof. The purpose of providing a number of annular series of bosses is to assure support of the outer sleeve from the inner sleeve even under conditions such that the installation may require the sleeves to be shortened.

The feature of providing the guard sleeves with annular flanges 23 to locate the bearing means by engaging them approximately diametrically is a feature which is valuable in and of itself apart from other features of the present invention. However, the arrangement whereby the collar portions 30 of bells 18 are slidable upon the sleeve to and from the positions to serve as outer races is another feature of great practical value, particularly in connection with the means by which the collars and the bell extensions of the guard housing can be detachably anchored in positions in which the collars serve as races, being readily movable to and from such positions for assembling and disassembling the bearings. It will be observed that the dimensions of the bearing means in relation to the thickness of the housing and the clearance between the inner and outer races is such that the flanges 23 punched from the outer guard sleeves 16 and 17 will engage the bearing means close to, or exactly at the desired diametrical planes intermediate the inner and outer races.

The end of collar 30 is desirably chamfered to overlie spring 32 slightly. In the event of end thrust on bell 18, the chamfer will wedge the spring 32 in groove 34, thus offering security against undesired displacement.

The embossing of one or both guard sleeves to provide limited areas of contact between the sleeves is of itself a feature which makes the device operate smoothly and desirably and virtually without noise.

Since this device is particularly intended for use on farm machinery, its extreme simplicity and ease of assembly and disassembly are of the utmost importance. Anyone, even a person with little or no mechanical experience, can remove and repair the device of the present invention. But for this ease of repair and replacement, a farmer might remove a damaged guard and leave it off rather than to repair and replace it.

I claim:

1. The combination with an extensible shaft comprising telescopically associated elements of non-circular cross section, means on respective elements providing inner bearing races, telescopically related guard sleeves enclosing the shaft elements and extending across respective bearing races and provided with bearing-receiving apertures in registry with said races, bearing means in the apertures engaging the respective inner races, outer races mounted on respective sleeves and confining the bearing means in the apertures thereof, bosses projecting radially from one of said sleeves toward the other, said sleeves being spaced by an amount equal to the thickness of said bosses whereby the sleeves are substantially free of contact with each other except as one of said sleeves is engaged by the bosses of the other.

2. The device of claim 1 in which said sleeves have integral flanges formed inwardly about respective bearing means at said apertures and constituting bearing-positioning means.

3. The device of claim 1 in which said sleeves have bell extensions provided with supporting collars, at least one of said collars being slidably mounted on one of said sleeves and constituting one of said retainers, the last mentioned sleeve having a flared terminal flange engaged by said one collar for the positioning thereof, and means for releasably holding said one collar to said flange.

4. The device of claim 3 in which said releasable holding means comprises a split ring engaged with the end of the collar remote from said flared flange and for which the last mentioned sleeve is provided with a groove in which the split ring is contractily engaged.

5. A shaft guard comprising the combination with a sleeve having bearing-receiving apertures, bearing means in said apertures and a race collar telescopically engaged with the sleeve and against which said bearing means bear, the said sleeve being shouldered and having an annular retainer removably engaging the shoulder, and the collar having a chamfered end partially overhanging the retainer and adapted to wedge said retainer against said shoulder in the event of pressure on the collar in a direction axially of the sleeve.

References Cited in the file of this patent

UNITED STATES PATENTS

| | | |
|---|---|---|
| 1,922,151 | Boice et al. | Aug. 15, 1933 |
| 2,772,550 | Harrington | Dec. 4, 1956 |
| 2,785,549 | Harrington | Mar. 19, 1957 |
| 2,793,512 | Larsen | May 28, 1957 |
| 2,796,749 | Warner | June 25, 1957 |